United States Patent
Sagawa et al.

(10) Patent No.: US 6,929,122 B2
(45) Date of Patent: Aug. 16, 2005

(54) PLASTIC CASE FOR STORING FOUR COMPACT DISCS

(75) Inventors: Mitsuo Sagawa, Chiba-ken (JP); Terumitsu Furuya, Chiba-ken (JP)

(73) Assignees: E-Life Manufacturing Service, Inc., Chiba-Ken (JP); Membran International GmbH, Hamburg (DE)

( * ) Notice: Subject to any disclaimer, the term of this patent is extended or adjusted under 35 U.S.C. 154(b) by 0 days.

(21) Appl. No.: 10/498,274

(22) PCT Filed: Nov. 6, 2002

(86) PCT No.: PCT/EP02/12385

§ 371 (c)(1),
(2), (4) Date: Oct. 12, 2004

(87) PCT Pub. No.: WO03/054883

PCT Pub. Date: Jul. 3, 2003

(65) Prior Publication Data

US 2005/0035012 A1 Feb. 17, 2005

(30) Foreign Application Priority Data

Dec. 11, 2001 (JP) ........................................ 2001-377881

(51) Int. Cl.[7] ........................... B65D 85/57; B65D 85/30
(52) U.S. Cl. ................................. 206/307.1; 206/308.1
(58) Field of Search ........................ 206/308.1, 307.1, 206/307, 310, 445; 312/9.9

(56) References Cited

U.S. PATENT DOCUMENTS

| | | | | |
|---|---|---|---|---|
| 5,322,162 A | * | 6/1994 | Melk | 206/310 |
| 5,590,767 A | | 1/1997 | Li | |
| 5,685,425 A | * | 11/1997 | Choi | 206/310 |
| 5,697,498 A | | 12/1997 | Weisburn et al. | |
| 5,839,576 A | * | 11/1998 | Kim | 206/308.1 |
| 5,931,294 A | * | 8/1999 | Weingarden et al. | 206/308.1 |
| 6,540,071 B2 | * | 4/2003 | Liu | 206/308.1 |
| 2002/0038770 A1 | * | 4/2002 | Liu | 206/308.1 |

FOREIGN PATENT DOCUMENTS

WO    WO 02/38469 A1    5/2002

* cited by examiner

Primary Examiner—Mickey Yu
Assistant Examiner—Faye Francis
(74) Attorney, Agent, or Firm—Kelly Lowry & Kelley, LLP (57) ABSTRACT

To provide a plastic case for storing four compact discs, in which a lid part 1 and a case proper 2 are rotatably pivoted at a hinge 3, clip members 4 for storing and holding a printed matter 9 are provided on backsides of the lid part 1 and the case proper 2, and a first tray 6 having a disc-fixing hook 10 placed to jut out front and back sides thereof is rotatably pivoted by the hinge 3 rotatably supporting the lid part 1 and the case proper 2 in a middle, and also a second hinge 8 is placed off a center so as to pivot in addition a second tray 7 by decentering the first tray 6. It is possible to store four compact discs and the printed matter therein and to be only 20 percent thicker therefor than a size of a conventional case capable of storing one compact disc and the printed matter therein, thus causing no difficulty in appearance of product, transportation, exhibition at a storefront and so on.

1 Claim, 8 Drawing Sheets

PLASTIC CASE FOR STORING FOUR COMPACT DISCS

BACKGROUND OF THE INVENTION

1. Field of the Invention

The present invention relates to a plastic case capable of holding four compact discs and printed matter therein.

2. Description of the Related Art

As a related art, there is an apparatus (see Japanese Patent No. 2863317 specification) for holding a compact disc having a central hole, the above described apparatus having a configuration wherein a base and disc engaging means extending from the base and releasably engaged with the central hole of the disc are provided, the above described disc engaging means having at least two radial arms elastically supported in a cantilever style by the above described base in a position clear of the base upward and extending inward respectively, and inner ends of both the arms form button-like members and have rims or lips configured to fix and hold the compact disc by getting engaged with a top face of the disc adjacent to the central hole of the disc held by the disc engaging means, and in order to release the disc pressure is applied to the button-like members to push down the arms, and thereby at least the center of the disc is pushed down so that the push renders the inner ends of both the arms closer to each other until the engagement of the rims or the lips on the top face of the disc adjacent to the central hole of the disc is securely released. In addition, in order to be capable of storing four compact discs and printed matter in the case, there is an apparatus of which height requires its thickness to be approximately 2.4 times thicker than the above conventional case capable of storing one compact disc and the printed matter.

However, the compact disc case capable of storing four compact discs and a booklet or a leaflet, a jacket, lyrics and so on which are the printed matter therein is more than twice as thick as the conventional ones, thus causing difficulties in appearance of the product, transportation, exhibition at a storefront and so on.

Furthermore, while two trays are required to hold four compact discs for instance, there is a problem that, if each tray has just one hinge, they are in a floating state since they cannot help rotating only 160 to 170 degrees unless they are thick enough to allow rotation of 180 degrees and so it is very difficult to push a disc-fixing hook portion when taking out the compact discs.

SUMMARY OF THE INVENTION

The present invention has been achieved in view of the above-described circumstances, and has as its object to provide a compact disc case that is a plastic case for storing four compact discs and the printed matter therein, the above described case having the hinge supporting one of the trays decentered so as to be a super-slim type approximately half as thick as the conventional ones and allow both the trays to rotate in a range of 180 degrees.

The present invention is intended to solve the above problem and has adopted the following technical means. As for the invention according to claim 1, the technical means is adopted, where it is a plastic case capable of holding four compact discs having a hole at the center thereof and storing printed matter therein, wherein a lid part and a case proper are rotatably pivoted at a hinge, clip members for storing and holding the printed matter are provided on the backsides of the lid part and the case proper, and a first tray having a disc-fixing hook engaged with the central holes of the compact discs to jut out the front and back sides thereof is rotatably pivoted by the hinge rotatably supporting the lid part and the case proper in the middle, and also a second hinge is placed off the center so as to pivot in addition a second tray by decentering the first tray.

DETAILED DESCRIPTION OF THE PREFERRED EMBODIMENTS

An embodiment of the present invention will be described in detail hereafter by referring to the accompanying drawings.

Figure 1:
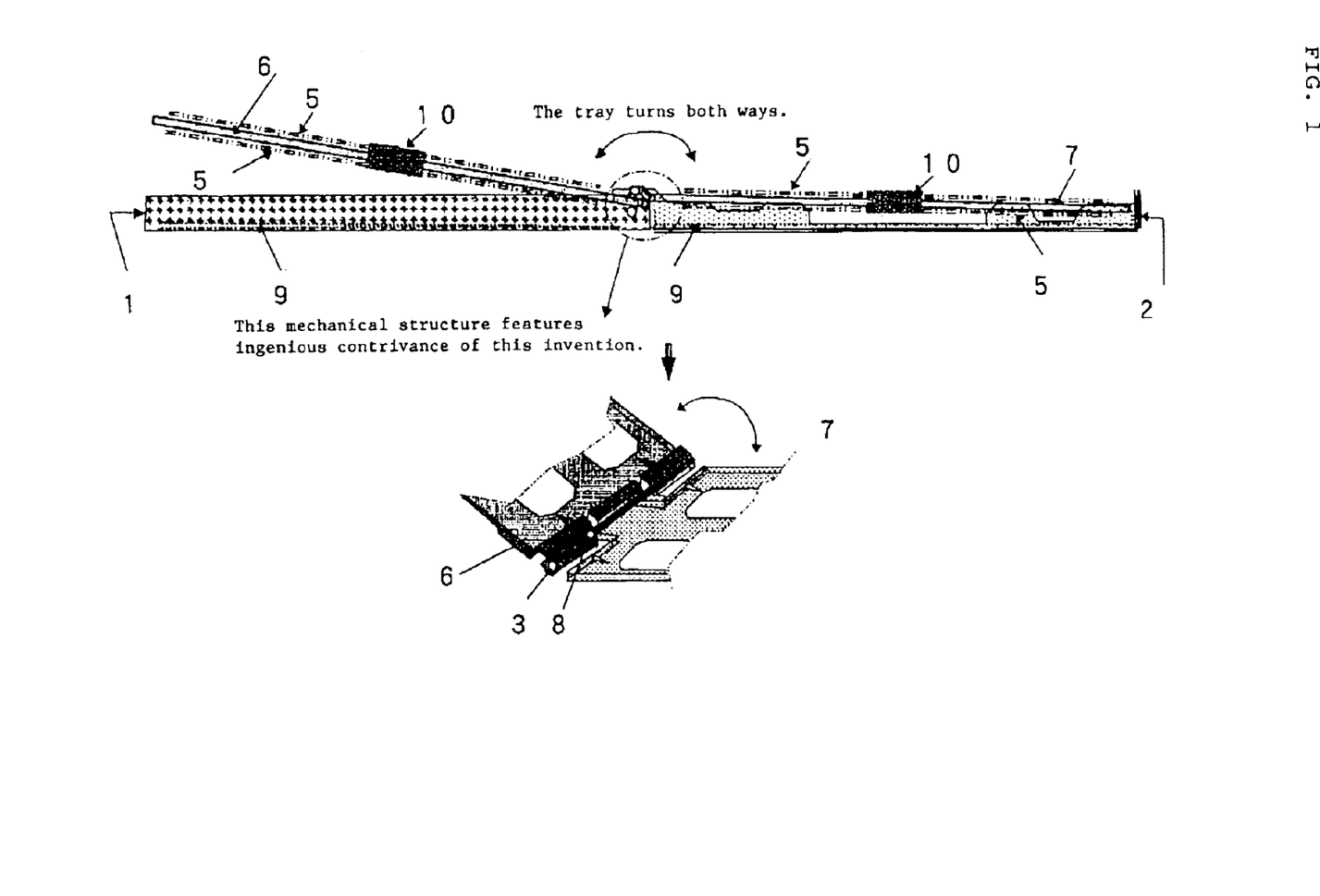
FIG. 1 is a conceptual side illustration showing a plastic case for storing four compact discs that is an embodiment of the present invention.
Figure 2:
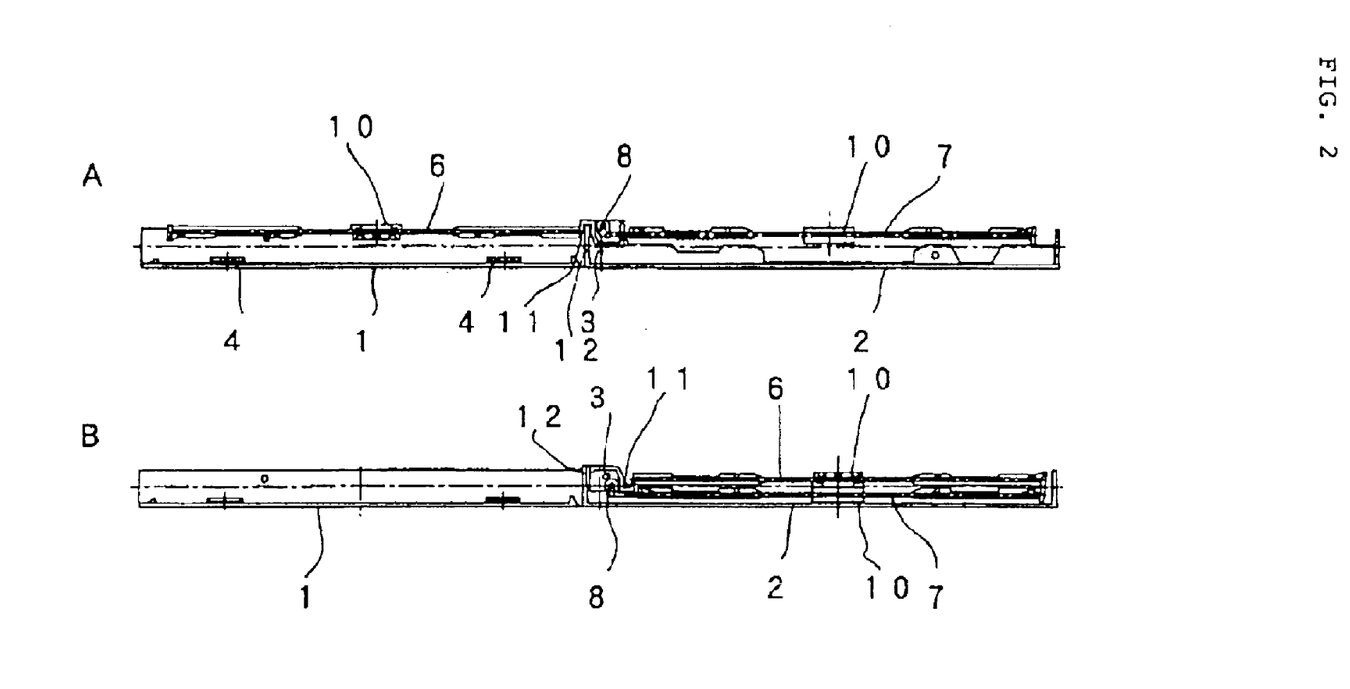
FIG. 2 are a side views showing an opened state of an assembly of a first tray and a second tray of the plastic case for storing four compact discs that is the embodiment of the present invention.
Figure 3:
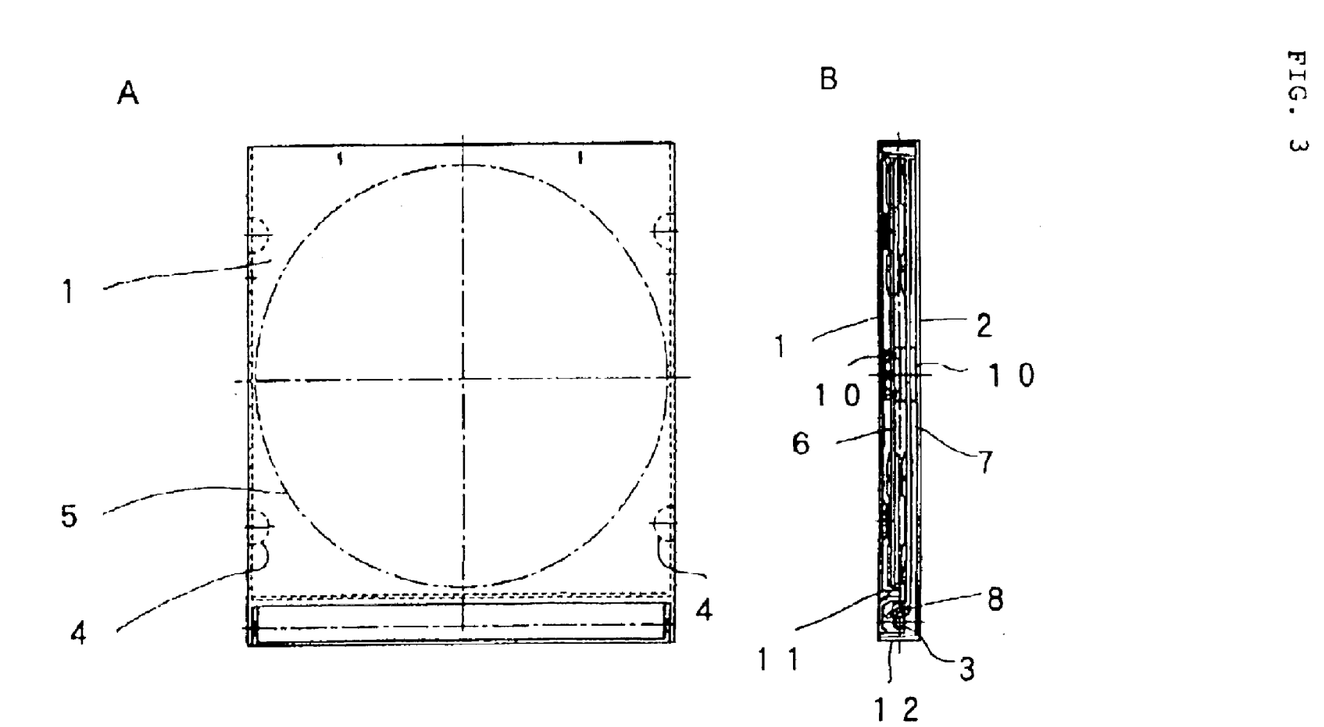
FIG. 3 are a plan view and a side view showing the assembly of the first tray and the second tray of the plastic case for storing four compact discs that is the embodiment of the present invention.
Figure 4:
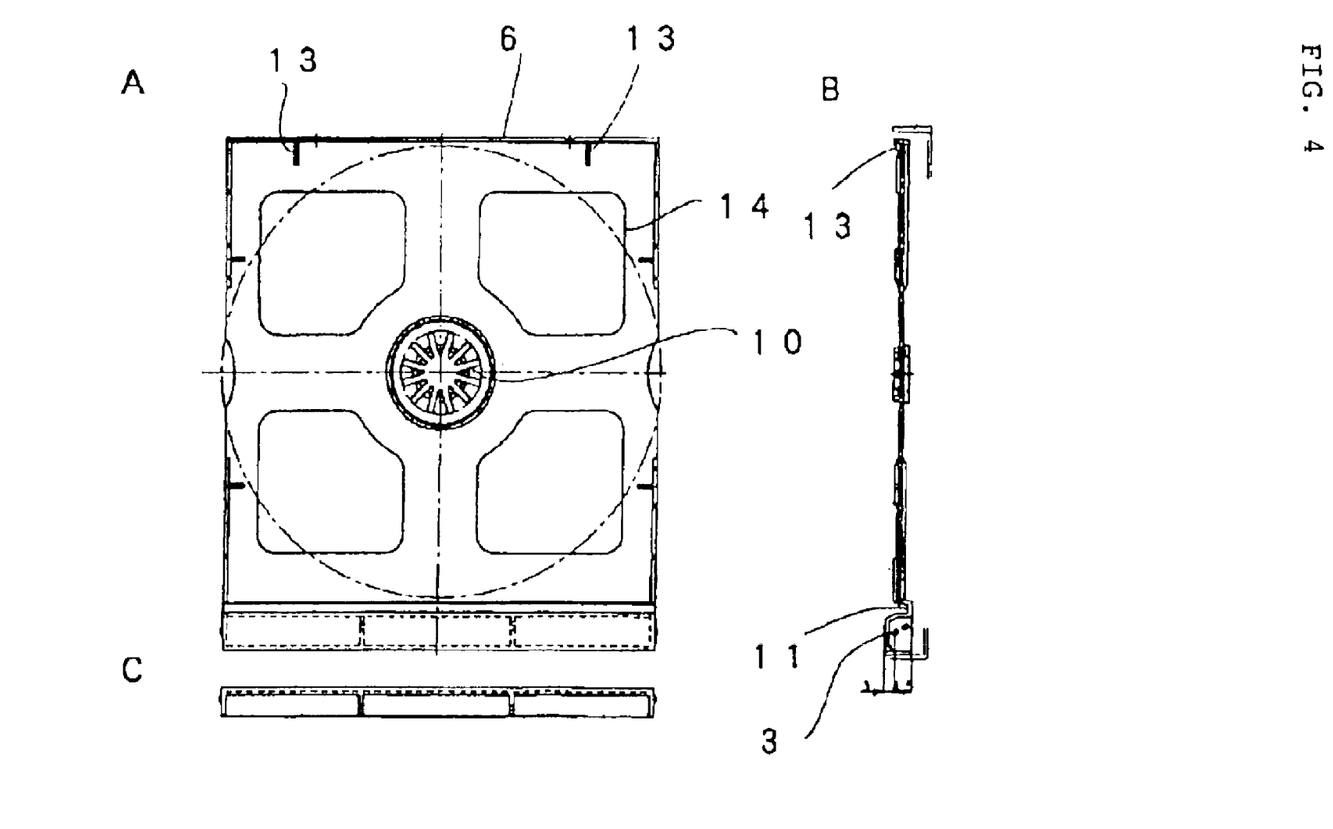
FIG. 4 are a plan view, a side view and a front view showing the first tray of the present invention.
Figure 5:
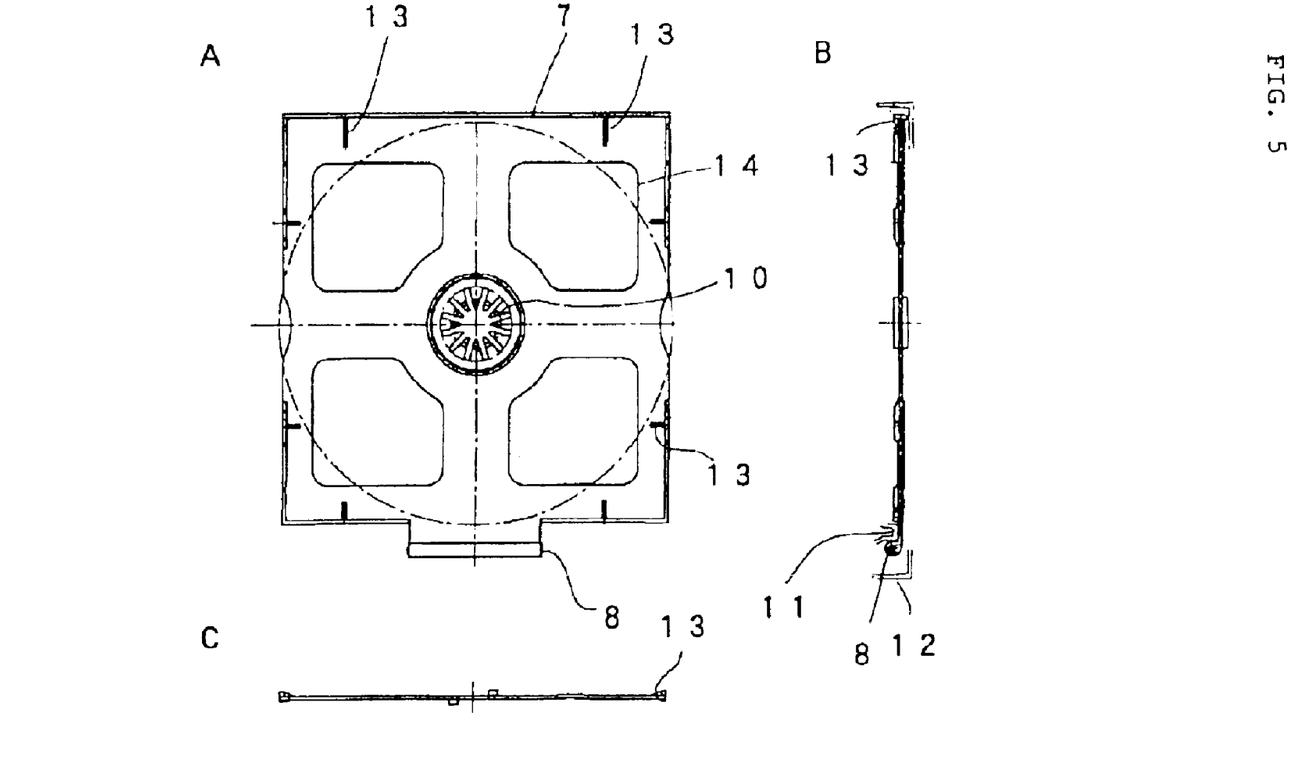
FIG. 5 are a plan view, a side view and a front view showing the second tray of the present invention.
Figure 6:
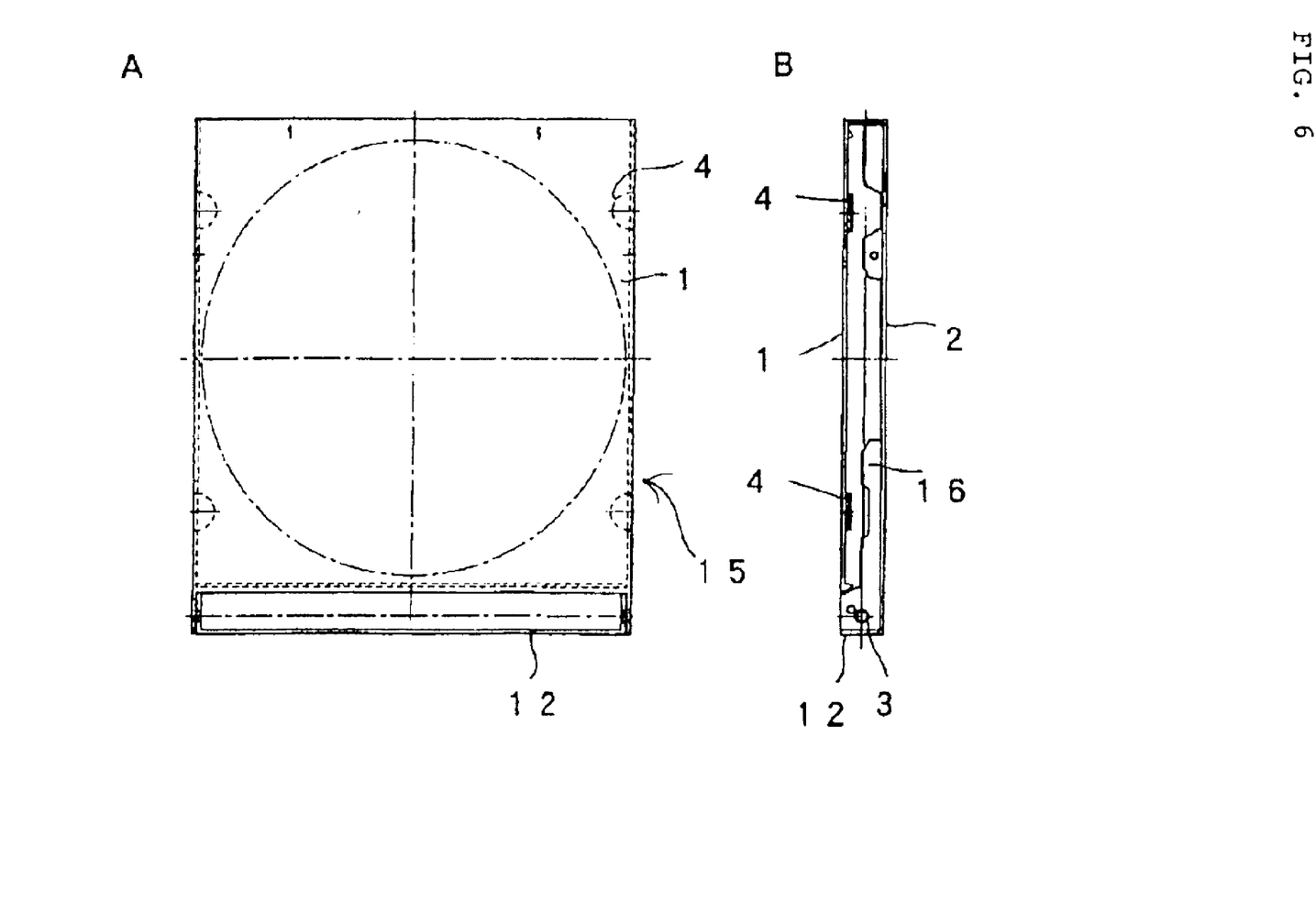
FIG. 6 are a plan view and a side view showing the compact disc case of the present invention.
Figure 7:
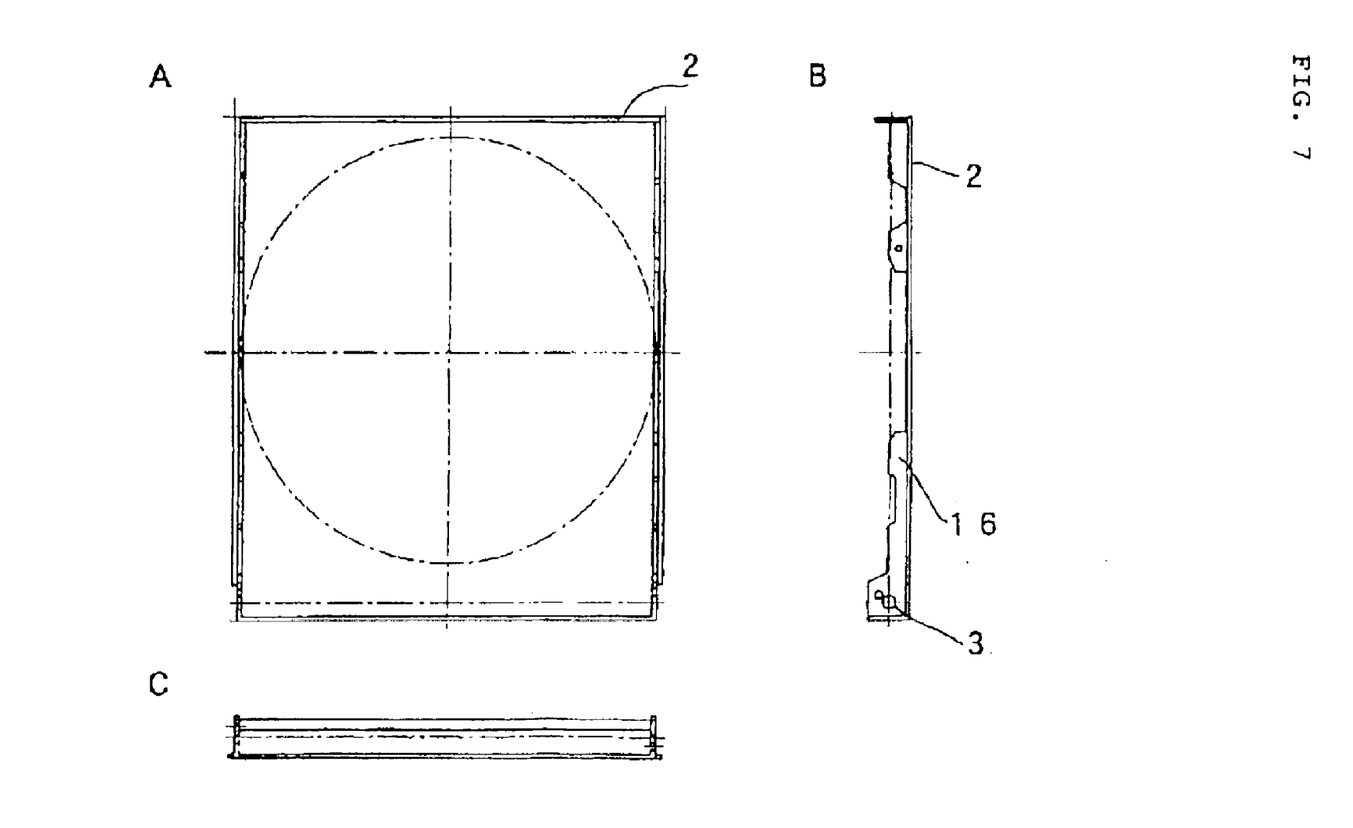
FIG. 7 are a plan view, a side view and a front view showing a case proper of the present invention.
Figure 8:
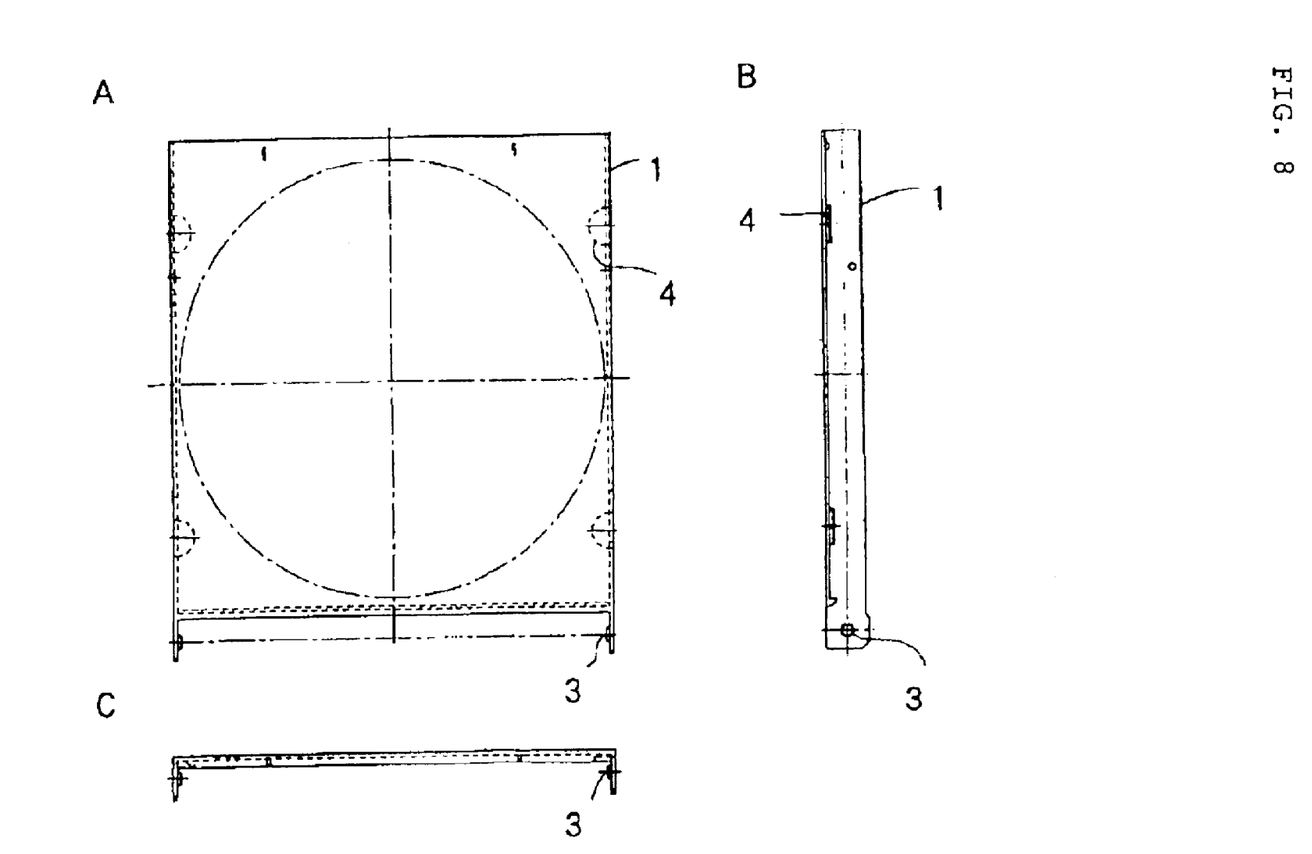
FIG. 8 are a plan view, a side view and a front view showing a lid part of the present invention.

First, an overview will be described based on FIG. 1 that is a conceptual side illustration allowing four compact discs and printed matter 9 to be stored in a case lid part 1 and a case proper 2.

The lid part 1 and the case proper 2 are formed with transparent plastics such as a copolymer of polypropylene, butadiene and styrene for instance, and a first tray 6 and a second tray 7 are composed by using the ones formed with transparent, semitransparent and opaque plastics, where it is a case capable of storing four compact discs 5 and the printed matter 9 therein, enabled in almost the same size (approximately 2 mm thicker) as the size and thickness of the conventional one-disc case capable of storing one compact disc 5 and the printed matter 9.

Furthermore, it will be described in detail based on FIGS. 2 to 8.

The lid part 1, the case proper 2, the first tray 6 and the second tray 7 can be rotationally opened and closed in a range of 0 to 180 degrees, and the hinges of the first tray 6 and the second tray 7 are well thought out so that each of the trays can smoothly rotate in the range of 180 degrees without difficulty, and also a first hinge 3 and a second hinge 8 are placed to be opened and closed so that, by decentering and supporting both the hinges, it can be automatically moved by the rotation of the hinges and can be stored in outer dimensions almost the same (slightly thicker than the conventional ones) as those of the conventional compact disc case.

Furthermore, the first tray 6 can be rotationally opened and closed by 180 degrees by adding a flute 11 to the upper portion thereof without having a rim 12 of the case proper 2 contact the first tray 6. Such a compact disc case allows an inlay jacket (printed matter put on the backside of the case proper: normally one sheet) and a front jacket (printed matter put on the front side of the lid part: also called a book) of a plurality of pages (up to those of approximately 20 pages) which are the printed matter belonging to the compact disc to be easily mounted as with the ordinary compact disc case for one disc.

Next, as is understandable from the drawing, FIG. 2A shows a state of having the first tray 6 opened, where a fulcrum of the second hinge 8 when the first tray 6 is opened and the position of the fulcrum thereof when the two trays, that is, the first tray 6 and the second tray 7 are piled as shown in FIG. 2B are different.

FIG. 3A is a plan view showing a closed state of the compact disc case, and FIG. 3B is a side view.

FIG. 4A is a plan view taking out and showing only the first tray 6, FIG. 4B is a side view, and FIG. 4C is a front view, where reference numeral 13 denotes stiffening ribs and 14 denotes holes for saving weight.

FIG. 5A is a plan view taking out and showing only the second tray 7, FIG. 5B is a side view, and FIG. 5C is a front view, where the stiffening ribs 13 and the holes 14 for saving weight are formed as in the first tray 6.

FIG. 6A is a plan view showing a compact disc case 15, and FIG. 6B is a side view, which is configured so as to open and close the lid part 1 and the case proper 2 by the hinge 3, and the case proper 2 has a wall 16 for reinforcement. Moreover, reference numeral 4 denotes clip members for holding the printed matter.

FIG. 7A is a plan view taking out and showing only the case proper 2 of the compact disc case 15, FIG. 7B is a side view, and FIG. 7C is a front view.

FIG. 8A is a plan view taking out and showing only the lid part 1 of the compact disc case 15, FIG. 8B is a side view, and FIG. 8C is a front view.

To set four compact discs 5 in the compact disc case 15 of the present invention, a compact disc-fixing hook 10 formed jutting out the front and back sides of the first tray 6 is inserted and engaged with the central holes of the total four compact discs 5, that is, one disc on each of the front and back sides of the two trays. When taking them out, the engagement can be released easily by pressing the compact disc-fixing hook 10.

As a result of adopting the above configuration, the present invention allows the following effects to be obtained.

(1) The case is capable of storing four compact discs and the printed matter therein and needs to be only 20 percent thicker therefor than the size of the conventional case capable of storing one compact disc and the printed matter therein, thus causing no difficulty in appearance of the product, transportation, exhibition at a storefront and so on.

(2) Though the jackets can be stored on the front and back sides and right and left side portions of the case, it is possible to store four compact discs just by slightly enlarging the case size.

(3) The lid part, the first tray and the second tray can be completely rotated in the range of 180 degrees so that the compact discs can be taken out and stored without difficulty.

REFERENCE NUMERALS

1. Lid part
2. Case proper
3. Hinge
4. Clip member (for holding the printed matter
5. Compact disc
6. First tray
7. Second tray
8. Second hinge
9. Printed matter
10. Disc-fixing hook
11. Flute
12. Rim
13. Stiffening rib
14. Hole for saving weight
15. compact disc
16. Wall (for reinforcement)

What is claimed is:

1. A plastic case capable of holding four compact discs (5) having a hole at a center thereof and storing printed matter therein, wherein a lid part (1) and a case proper (2) are rotatably pivoted at a first hinge (3), clip members (4) for storing and holding the printed matter (9) are provided on backsides of the lid part (1) and the case proper (2), a first tray (6) having a disc-fixing hook (10) engaged with central holes of the compact discs (5) to jut out the front and back sides thereof is rotatably pivoted by the first hinge (3) rotatably supporting the lid part (1) and the case proper (6) in a middle, and a second hinge (8) is placed off the center so as to pivot in addition a second tray (7) by decentering the first tray (6), characterized in that a fule (11) is provided in the upper portion of the first tray (6) in order that the first tray (6) can be opened and closed by 180 degrees without having contact with a rim (12) of the case proper (2) and that the first tray (6) and/or the second tray (7) comprise holes (14) for saving weight as well as stiffening ribs (13).

\* \* \* \* \*

UNITED STATES PATENT AND TRADEMARK OFFICE
CERTIFICATE OF CORRECTION

| | |
|---|---|
| PATENT NO. | : 6,929,122 B2 |
| DATED | : August 16, 2005 |
| INVENTOR(S) | : Mitsuo Sagawa and Tenumitsu Furuya |

It is certified that error appears in the above-identified patent and that said Letters Patent is hereby corrected as shown below:

<u>Column 4,</u>
Line 43, replace "(6)" with -- (2) --.

Signed and Sealed this

Twenty-ninth Day of November, 2005

JON W. DUDAS
*Director of the United States Patent and Trademark Office*